United States Patent [19]
Yamada

[11] Patent Number: 5,553,922
[45] Date of Patent: Sep. 10, 1996

[54] SEAT RECLINING APPARATUS

[75] Inventor: Yukifumi Yamada, Toyota, Japan

[73] Assignee: Aisin Seiki Kabushiki Kaisha, Japan

[21] Appl. No.: 183,229

[22] Filed: Jan. 19, 1994

[30] Foreign Application Priority Data

Jan. 20, 1993 [JP] Japan .................. 5-007680

[51] Int. Cl.$^6$ .................. B60N 2/02
[52] U.S. Cl. .................. 297/362; 297/367
[58] Field of Search .................. 297/362, 367, 297/368, 369

[56] References Cited

U.S. PATENT DOCUMENTS

| | | | |
|---|---|---|---|
| 4,332,418 | 6/1982 | Strowik | 297/362 |
| 4,715,655 | 12/1987 | Katsumoto et al. | 297/362 |
| 4,874,204 | 10/1989 | Walk | 297/367 |
| 4,930,841 | 6/1990 | Wittig | 297/362 |
| 4,943,116 | 7/1990 | Ohwada et al. | 297/362 |

FOREIGN PATENT DOCUMENTS

| | | |
|---|---|---|
| 2854636A1 | 7/1980 | Germany . |
| 3130314C2 | 11/1989 | Germany . |
| 3616832C2 | 10/1992 | Germany . |
| 63-65325 | 12/1988 | Japan . |
| 5-168538 | 7/1993 | Japan . |

OTHER PUBLICATIONS

Translation of Official Letter dated Sep. 8, 1994 in German Patent Application P 44 01 454.6–14.

*Primary Examiner*—Laurie K. Cranmer
*Attorney, Agent, or Firm*—Finnegan, Henderson, Farabow, Garrett & Dunner

[57] ABSTRACT

A seat reclining apparatus includes a lower arm for mounting a seat cushion, a shaft having a first centric portion rotatably supported at the lower arm, an eccentric portion and a second centric portion of the shaft, an upper arm for mounting a seat-back, mounted on the eccentric portion of the shaft and having an inner gear, a locking arm mounted on the second centric portion of the shaft, engaged with the lower arm, and having an outer gear meshed with the inner gear of the upper arm, the number of teeth of the outer gear differing from that of the inner gear, a release device for releasing the engagement between the locking arm and the lower arm, a bushing secured to the lower arm and rotatably supporting the second centric portion of the shaft, a spiral spring mounted on the bushing and having an inner end connected thereto and an outer end connected to the locking arm for urging the locking arm in one direction, a handle connected to the shaft, and a braking device disposed between the bushing and the handle for restricting rotation of the shaft when the handle is not being manipulated, said braking device being released to permit rotation of the shaft when the handle is manipulated.

4 Claims, 3 Drawing Sheets

SEAT RECLINING APPARATUS

BACKGROUND OF THE INVENTION

The present invention relates to a seat reclining apparatus for adjusting the reclining angle of a seat-back.

In the conventional seat reclining apparatus of the kind, a handle operated gear mechanism is used for adjusting the reclining angle as disclosed, for example, in Japanese Patent Publication No. Sho63(1988)-65325. The conventional seat reclining apparatus has an upper gear provided on the side of a seat-back frame, and a lower gear provided on the seat-cushion frame. The number of teeth of one of these two gears is at least one less than the number of teeth of the other. The two gears are meshed with each other and are supported on coaxial and eccentric portions of a shaft. The conventional seat reclining apparatus is so adapted that rotating the shaft makes it possible to recline the seat-back relative to the seat cushion. In order to retain the adjusted or reclined condition of the seat-back as it is, a washer is disposed in a frictional manner between the upper gear and the seat-cushion bracket.

However, the foregoing frictional force of the washer between the the outer gear and the seat-cushion bracket will prevent a smooth rotation of the shaft, which brings in that the reclining angle adjustment is cumbersome.

SUMMARY OF THE INVENTION

It is, therefore, a principal object of the present invention to provide a seat reclining apparatus without the foregoing drawback.

Another object of the present invention is to provide seat reclining apparatus a shaft for operating a gear mechanism is free from a frictional force for retaining a reclined condition.

To achieve the objects and in accordance with the purpose of the invention, as embodied and broadly described herein, the seat reclining apparatus of the present invention comprises a lower arm for mounting to a seat cushion, a shaft having a first centric portion rotatably supported at the lower arm, an eccentric portion and a second centric portion, an upper arm for mounting to a seat-back, the upper arm mounted on the eccentric portion of the shaft, and having a first gear, a locking arm mounted on the second centric portion of the shaft, engaged with the lower arm, and having a second gear meshed with the first gear, the number of teeth of the second gear differing from the number of teeth of the first gear, release means for releasing the engagement between the locking arm and the lower arm, a bushing connected with the lower arm and rotatably supporting the second centric portion of the shaft, a spiral spring mounted on the bushing and having an inner end connected thereto and an outer end connected to the locking arm for urging the locking arm in one direction, a handle connected to the shaft for rotating the shaft, and braking means disposed between the bushing and the handle for restricting rotation of the shaft when the handle is not being manipulated, the braking means being released to permit rotation of the shaft when the handle is manipulated. to provide a seat reclining apparatus without the foregoing drawback.

Another object of the present invention is to provide seat reclining apparatus a shaft for operating a gear mechanism is free from a frictional force for retaining a reclined condition.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which.

DESCRIPTION OF A PREFERRED EMBODIMENT

A preferred embodiment of the present invention will be described hereinunder in detail with reference to the accompanying drawings.

Figure 1:
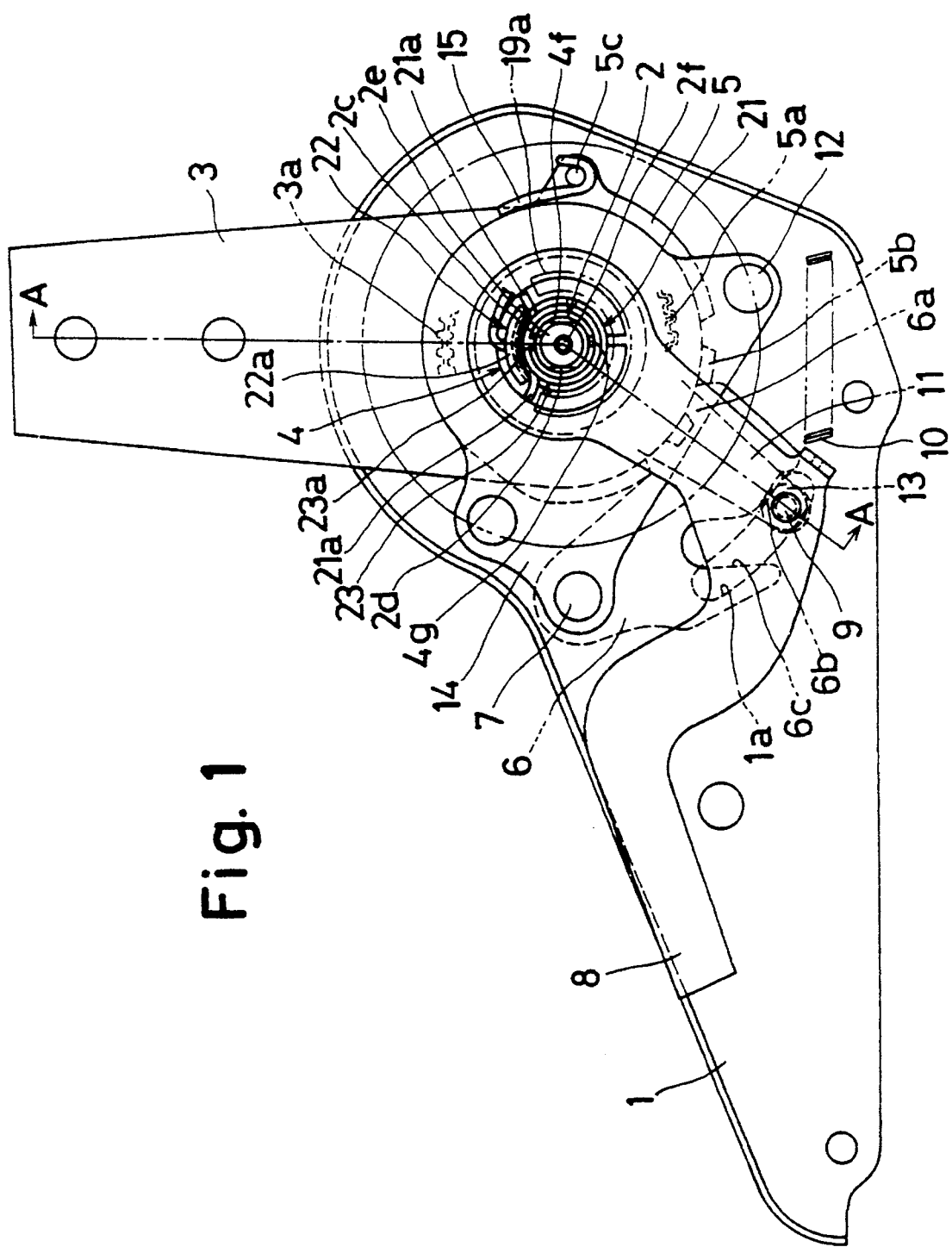
FIG. 1 is a side view of a seat reclining apparatus in accordance with the present invention.
Figure 2:
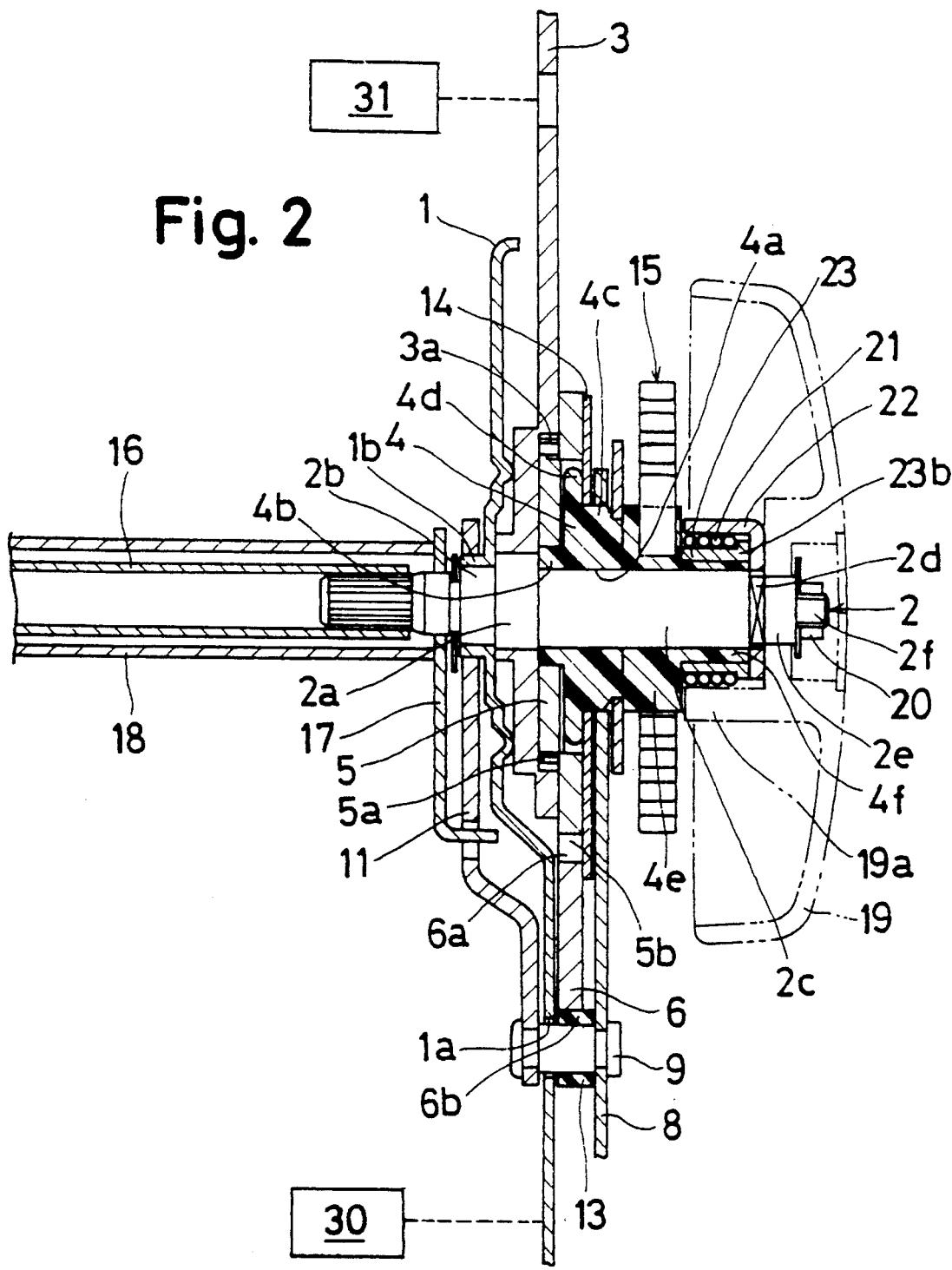
FIG. 2 is a cross-sectional view taken along line A—A in FIG. 1.

Referring first to FIGS. 1 and 2, a seat reclining apparatus includes a pair of lower arms or seat-cushion frames 1 (only one is shown) which are secured to both lateral sides of a seat cushion 30. A shaft or pivot pin 2 has a first portion 2b, a second portion 2a which is eccentric relative to the first portion 2b, and a third portion 2c which is in alignment with the first portion 2b. The portions 2b, 2a and 2c are arranged in this order from the left to the right in FIG. 2. The pivot pin 2 is rotatably mounted at the first portion 2a thereof to the lower arm 1. On the second or eccentric portion 2a of the pivot pin 2, there is rotatably mounted an upper arm 3 which is secured to a seat-back 31. On the third portion 2c of the pivot pin 2, there is mounted a bushing 4 on which a locking arm 5 is rotatably mounted. The upper arm 3 is provided with an inner gear portion having a plurality of circumferentially arranged teeth 3a. This circumferential arrangement is set to be co-axial with the second or eccentric portion 2a of the pivot pin 2. The locking arm 5 is provided with an outer gear portion having a plurality of circumferentially arranged teeth 5a. This circumferential arrangement is set to be co-axial with the third portion 2c of the pivot pin 2. The number of teeth 5a is less than that of the teeth 3a by one. One or more teeth 3a are in meshing engagement with one or more teeth 5a, which brings a rotation of the upper arm 3 relative to the locking arm 5 if the pivot pin 2 is rotated.

Along an outer periphery of the locking arm 5, there are formed a plurality of circumferentially spaced teeth 5b. A pawl 6 is pivoted to the lower arm 1 via a pin 7 and has a plurality of teeth 6a which are in engagement with the teeth 5b. At a back side of the pawl 6, there are provided a cam surface 6b and projection 6c. The third portion 2c of the pivot pin 2 is mounted thereon with the bushing 4 and on the bushing 4 there is rotatably mounted a release lever 8. A pin 9 on which a roller 13 is rotatably mounted is secured to the release lever 8 in order that the roller 13 may be brought into engagement with any one of the cam surface 6b or the projection 6c. The engagement of the roller 13 with the cam surface 6b of the pawl 6 will establish an engagement between the teeth 6a of the pawl 6 and the teeth 5b of the locking arm 5 which brings a locked condition between the lower arm 1 and the locking arm 5. The engagement of the roller 13 with the projection 6c of the pawl 6 will disengages the teeth 6a of the pawl 6 from the teeth 5a of the locking arm 5 which brings a disengagement between the lower arm 1 and the locking arm 5. A spring 10 is disposed between the release lever 8 and the lower arm 1 in order to urge the roller 13 toward the cam surface 6b for the engagement between the teeth 6a and the teeth 5b. In addition, the pin 9 is extended into a slot 1a formed in the lower arm 1 so as to be guided therealong. The pin 9 is also supported by a plate 11 which is movable on a boss portion 1b of the lower arm 1. The boss portion 1b of the lower arm 1 is rotatably mounted on the first portion 2b of the pivot pin 2. The pawl 5, the upper arm 3 and related portions thereto are covered with a sub plate 14 which is supported by the pin 7, the pivot pin 2 and the pin 12.

The bushing 4 includes an axial hole 4a into which the pivot pin 2 is inserted rotatably, a first or reduced portion 4b on which the locking arm 5 is rotatably mounted, a second or enlarged portion 4c on which the release lever 8 is rotatably mounted, and a flange 4d which is formed between the portions 4b and 4c. The flange 4d of the bushing 4 is held between the lower arm 1 and the sub plate 14 which is secured to the lower arm by pins 7 and 12, which results in that the bushing 4 is fixedly mounted to the lower arm 1.

Figure 3:
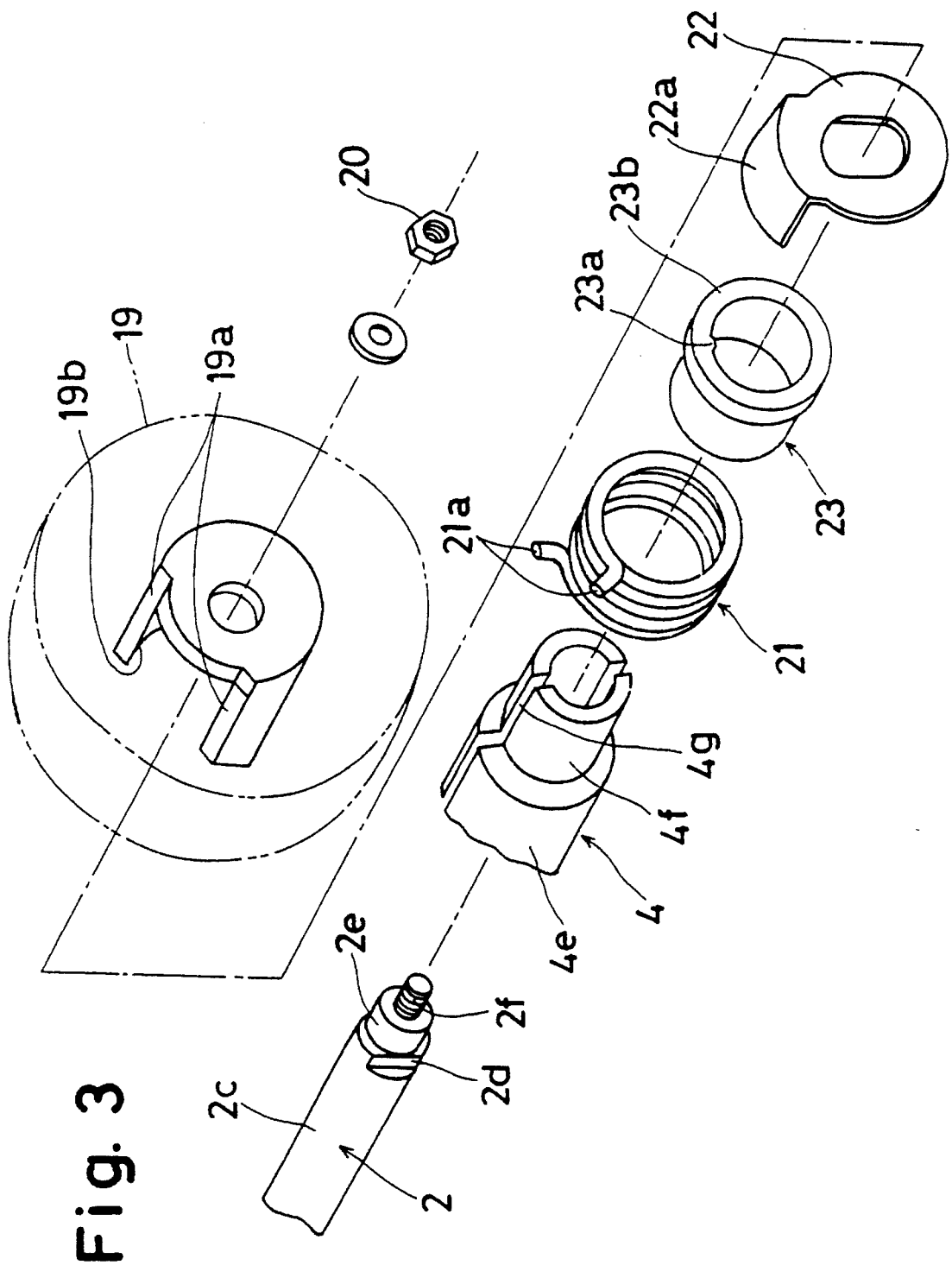
FIG. 3 is an exploded perspective view of a principal portion of a seat reclining apparatus in accordance with the present invention.

As seen from FIGS. 1 and 3, at an outer portion of the pivot pin 2, there are provided a pair of opposed flat portions 2d, a fourth portion 2e which is smaller than the third portion 2c in radius, and a thread portion 2f. A handle 19 is rotatably mounted on the fourth portion 2e of the pivot pin 2 and is prevented from being removed from the pivot pin 2 by a nut 20 which is engaged with the thread portion 2f of the pivot pin 2. The handle 19 has a cutout portion 19b defined by opposed end portion 19a which is engageble with a cam 22. The cam 22 has an axial extension 22a so as to be positioned between the end portions 19a of the handle 19. The extension 22a of the cam 22 is engageble with the handle 19 via a coil spring 21. The relationship between the cam 22 and the handle 19 will be detailed later.

At an outer portion of the bushing 4, there are formed a third or enlarged portion 4e and a fourth or reduced portion 4f. A pair of grooves 4g extend in the axial direction of the bushing 4 so as to halve the third portion 4e and the fourth portion 4f. Around the third portion 4e of the bush 4, there is wound a spiral spring 15 whose one end is fitted into the grooves 4g. The other end of the spiral spring 15 is secured to a pin 5c on the locking arm 5. Thus, the spiral spring 15 urges continually the locking arm 5 in the counterclockwise direction in FIG. 1.

A sleeve 23 is mounted on the fourth portion 4g of the bushing 4 and an inner projection 23a of the sleeve 23 is fitted in the groove 4g which establishes an immovable connection between the bushing 4 and the sleeve 23. Around the sleeve 23, there is wound a coil spring 21. A flange 23b of the sleeve 23 is in engagement with the coil spring 21, by which the extraction or removal thereof from the bushing 4 is prevented. The coil spring 21, when it is in a natural condition, is in frictional engagement with the outer surface of the sleeve 23, and each end portions 21a of the coil spring 21 is held between the end portion 19a of the handle 19 and the extension 22a of the cam 22. The frictional engagement between the coil spring 21 and the sleeve 23 restricts the rotation of the pivot pin 2 and therefore the adjusted or reclined condition of the seat back 31 will not change despite the torque transmission from the upper arm 3 to the handle 19 as a result of the occupant's leaning against the seat-back 31. The sleeve 23, the coil spring 21 and the cam 22 are accommodated within the handle 19.

It is to be noted that similar mechanism (not shown) is located at opposite side of the seat cushion and both pivot pins 2 are connected to each other by a pipe 16 and both plates 11 are connected to each other by a pipe 18.

FIG. 1 shows the initial condition of the seat reclining apparatus under which the locking arm 5 is in the locked condition by the engagement between the teeth 6a of the pawl 6 and the teeth 5a of the locking arm 5 as well as the rotation of the pivot pin 2 is under a restriction by the frictional engagement between the coil spring 21 and the sleeve 23. Under such a situation or condition, when the handle 19 is rotated the end portion 19a of the handle 19 will expand or enlarge the radius of the coil spring 21 by engaging the end portion 21a of the coil spring 21, which results in that the frictional engagement between the coil spring 21 and the sleeve 23 is released, the end portion 19a of the cam 22 and the pivot pin 2 is brought into rotation. Thus, the engagement of teeth 3a and the teeth 5a bring the rotation of about the upper arm 3 relative to the locking arm 5, thereby establishing a precise adjustment of the reclining angle of the seat-back in unison with the upper arm 3 relative to the seat-cushion secured to the lower arm 1. During this adjustment, since both the locking arm 5 and the bushing 4 do not move, the spiral spring 15 takes no action.

The rotation of the release lever 8 against the urging force of the spring 10 will bring rotation of the pawl 6 as well as removal of the pin 9 from the cam surface 6b, which results in the release of the teeth 6a of the pawl 6 from the teeth 5a of the locking arm 5 and the lower arm 1 becomes free from the locking arm 5. Thus, the upper arm 3 in unison with the locking arm 5 rotates toward the lower arm 1 by the urging of the spring 13. During this movement, since the axis of the spiral spring 15 is in alignment with those of the upper arm 3 and the locking arm 5, the urging force of the spiral spring 15 is available without loss. Thus, a frontward inclination of the seat-back relative to the seat cushion 30 is established, re-locking of the lower arm 1 to the locking arm 5 is established such that the teeth 6a of the pawl 6 and the teeth 5b of the locking arm 5 are brought into engagement with each other by cancelling the rotational operation of the release lever 8, with a rough adjustment of the reclining angle of the seat-back 31 relative to the seat cushion 30.

As detailed above, since the spiral spring 15 is positioned via the bushing 4 in the vicinity of the pivot pin 2, the width of the seat reclining apparatus per se can be reduced in comparison with the conventional one. Moreover, the spiral spring 15 is independent of the pivot pin 2 by locating the bushing 4 therebetween, which results in that the spiral spring 15 is set to be operated only for the rough adjustment of the reclining angle of the seat-back 31 relative to the seat-cushion 30 and is at rest for the precise adjustment of the reclining angle of the seat-back 31 relative to the seat-cushion 30. In addition, the axial length between the bushing 4 and the pin 5c on the locking plate 5 both of which are affected by both of the end portions of the spiral spring 15 can be reduced in comparison with the conventional one, and generation of friction and twist at the spiral spring 15 are prevented which enables a full availability of the urging force thereof. Furthermore, because the sleeve 23 and the coil spring 21 which act as a braking means are mounted on the bush 4 within the handle 19, the lateral length of the seat reclining apparatus can be reduced in comparison with the conventional one. The braking means will retain the adjusted or reclined position of the seat-back 31 as it is even though torque is transmitted from the upper arm 3 to the handle 19.

The invention has thus been shown and described with reference to reference to a specific embodiment, however, it should be noted that the invention is in no way limited to the details of the illustrated structures but changes and modifications may be made without departing from the scope of the appended claims.

What is claimed is:

1. A seat reclining apparatus comprising:

a lower arm for mounting to a seat cushion;

a shaft having a first centric portion rotatably supported at the lower arm, an eccentric portion and a second centric portion;

an upper arm for mounting to a seat-back, said upper arm mounted on the eccentric portion of the shaft, and having a first gear;

a locking arm mounted on the second centric portion of the shaft, engaged with the lower arm, and having a second gear meshed with the first gear, the number of teeth of the second gear differing from the number of teeth of the first gear;

release means for releasing the engagement between the locking arm and the lower arm;

a bushing connected with the lower arm and rotatably supporting the second centric portion of the shaft;

a spiral spring mounted on the bushing and having an inner end connected thereto and an outer end connected to the locking arm for urging the locking arm in one direction;

a handle connected to the shaft for rotating the shaft; and braking means disposed between the bushing and the handle for restricting rotation of the shaft when the handle is not being manipulated, said braking means being released to permit rotation of the shaft when the handle is manipulated.

2. A seat reclining apparatus in accordance with claim 1, wherein the handle has a pair of circumferentially spaced first end portions, and the braking means includes a sleeve fixedly mounted on the bushing, a coil spring positioned around and in frictional engagement with the sleeve and having a pair of axially and circumferentially displaced second end portions positioned between the first end portions of the handle, and further comprising an extension secured to the shaft and extending along the axial direction of the coil spring so as to be positioned between said second end portions.

3. A seat reclining apparatus in accordance with claim 2, wherein the circumferentially spaced end portions of the handle make an acute angle therebetween.

4. A seat reclining apparatus in accordance with claim 2, wherein the axially and circumferentially spaced second end portions of the coil spring extend outwardly in the radial direction.

* * * * *